US012620119B2

(12) United States Patent
Rao et al.

(10) Patent No.: US 12,620,119 B2
(45) Date of Patent: May 5, 2026

(54) VIDEO ANALYTICS ACCURACY USING TRANSFER LEARNING

(71) Applicant: NEC Laboratories America, Inc., Princeton, NJ (US)

(72) Inventors: Kunal Rao, Monroe, NJ (US); Giuseppe Coviello, Robbinsville, NJ (US); Murugan Sankaradas, Dayton, NJ (US); Oliver Po, San Jose, CA (US); Srimat Chakradhar, Manalapan, NJ (US); Sibendu Paul, West Lafayette, IN (US)

(73) Assignee: NEC Corporation, Tokyo (JP)

( * ) Notice: Subject to any disclaimer, the term of this patent is extended or adjusted under 35 U.S.C. 154(b) by 341 days.

(21) Appl. No.: 18/361,340

(22) Filed: Jul. 28, 2023

(65) Prior Publication Data

US 2024/0037778 A1 Feb. 1, 2024

Related U.S. Application Data

(60) Provisional application No. 63/393,900, filed on Jul. 30, 2022.

(51) Int. Cl.
G06T 7/70 (2017.01)
G06T 7/00 (2017.01)
(Continued)

(52) U.S. Cl.
CPC .............. G06T 7/70 (2017.01); G06T 7/0002 (2013.01); G06V 10/25 (2022.01); G06V 40/103 (2022.01);
(Continued)

(58) Field of Classification Search
CPC .................... G06T 7/70; G06T 7/0002; G06T 2207/30242; G06V 10/25; G06V 40/103; G06V 2201/07; G06V 10/82; G06V 20/52
See application file for complete search history.

(56) References Cited

U.S. PATENT DOCUMENTS

| | | | |
|---|---|---|---|
| 11,004,212 B1* | 5/2021 | Liu | G06T 7/248 |
| 2018/0268534 A1* | 9/2018 | Kaneko | G06T 7/001 |

(Continued)

OTHER PUBLICATIONS

Moon, J., Lim, S., Lee, H., Yu, S., & Lee, K. B. (2022). Smart count system based on object detection using deep learning. Remote Sensing, 14(15), 3761.*

(Continued)

*Primary Examiner* — Amandeep Saini
*Assistant Examiner* — Andrew S Budisalich
(74) *Attorney, Agent, or Firm* — Vincent Duffy; Joseph Kolodka

(57) ABSTRACT

Systems and methods are provided for increasing accuracy of video analytics tasks in real-time by acquiring a video, and identifying fluctuations in the accuracy of video analytics applications across consecutive frames of the video. The systems and methods can support decision-making based on results of video analytics tasks. The fluctuations are quantified based on an average relative difference of true-positive detection counts across consecutive frames. Fluctuations in accuracy are reduced by applying transfer learning to a deep learning model trained using images, and retraining the deep learning model using video frames. A quality of object detections is determined based on an amount of track-ids assigned by a tracker across different video frames. Optimization of the reduction of fluctuations includes iteratively repeating the identifying, the quantifying, the reducing, and the determining the quality of object detections until a threshold is reached. Frame predictions are generated using the retrained deep learning model.

17 Claims, 8 Drawing Sheets

(51) Int. Cl.

| | |
|---|---|
| *G06V 10/25* | (2022.01) |
| *G06V 10/82* | (2022.01) |
| *G06V 20/52* | (2022.01) |
| *G06V 40/10* | (2022.01) |

(52) U.S. Cl.
CPC .......................... *G06T 2207/30242* (2013.01);
*G06V 2201/07* (2022.01)

(56) References Cited

U.S. PATENT DOCUMENTS

| | | | |
|---|---|---|---|
| 2019/0188830 A1* | 6/2019 | Edwards ................ | G06N 3/047 |
| 2020/0364468 A1* | 11/2020 | Sulzer ................... | G06F 18/217 |
| 2021/0262913 A1* | 8/2021 | D'Apuzzo ......... | G01N 15/1429 |
| 2021/0287014 A1* | 9/2021 | Colachis ................ | G06V 20/64 |
| 2021/0303897 A1* | 9/2021 | Kelly ................. | G07F 17/3227 |
| 2024/0032827 A1* | 2/2024 | Durr ...................... | A61B 5/743 |

OTHER PUBLICATIONS

Bewley, A., Ge, Z., Ott, L., Ramos, F., & Upcroft, B. (Sep. 25, 2016). Simple online and realtime tracking. In 2016 IEEE international conference on image processing (ICIP) (pp. 3464-3468). IEEE.

Bochkovskiy, A., Wang, C. Y., & Liao, H. Y. M. (Apr. 23, 2020). Yolov4: Optimal speed and accuracy of object detection. arXiv preprint arXiv:2004.10934.

Canel, C., Kim, T., Zhou, G., Li, C., Lim, H., Andersen, D. G., . . . & Dulloor, S. (Apr. 15, 2019). Scaling video analytics on constrained edge nodes. Proceedings of Machine Learning and Systems, 1, 406-417.

Chen, T. Y. H., Ravindranath, L., Deng, S., Bahl, P., & Balakrishnan, H. (Nov. 1, 2015). Glimpse: Continuous, real-time object recognition on mobile devices. In Proceedings of the 13th ACM Conference on Embedded Networked Sensor Systems (pp. 155-168).

Cheng, M., Lei, Q., Chen, P. Y., Dhillon, I., & Hsieh, C. J. (Feb. 17, 2020). Cat: Customized adversarial training for improved robustness. arXiv preprint arXiv:2002.06789.

Chiu, Y. C., Tsai, C. Y., Ruan, M. D., Shen, G. Y., & Lee, T. T. (Aug. 31, 2020). Mobilenet-SSDv2: An improved object detection model for embedded systems. In 2020 International conference on system science and engineering (ICSSE) (pp. 1-5). IEEE.

Cnet, Shankland, S. (Dec. 8, 2018) How 5G aims to end network latency. https://www.cnet.com/tech/mobile/how-5g-aims-to-end-network-latency-response-time/.

Deng, J., Guo, J., Zhou, Y., Yu, J., Kotsia, I., & Zafeiriou, S. (May 4, 2019). Retinaface: Single-stage dense face localisation in the wild. arXiv preprint arXiv:1905.00641.

Du, K., Pervaiz, A., Yuan, X., Chowdhery, A., Zhang, Q., Hoffmann, H., & Jiang, J. (Jul. 30, 2020). Server-driven video streaming for deep learning inference. In Proceedings of the Annual conference of the ACM Special Interest Group on Data Communication on the applications, technologies, architectures, and protocols for computer communication (pp. 557-570).

Everingham, M., Van Gool, L., Williams, C. K., Winn, J., & Zisserman, A. (Sep. 9, 2009). The pascal visual object classes (voc) challenge. International journal of computer vision, 88, 303-338.

Fang, Y., Zhan, B., Cai, W., Gao, S., & Hu, B. (Jul. 18, 2019). Locality-constrained spatial transformer network for video crowd counting. In 2019 IEEE international conference on multimedia and expo (ICME) (pp. 814-819). IEEE.

Geirhos, R., Rubisch, P., Michaelis, C., Bethge, M., Wichmann, F. A., & Brendel, W. (Nov. 29, 2018). ImageNet-trained CNNs are biased towards texture; increasing shape bias improves accuracy and robustness. arXiv preprint arXiv:1811.12231.

Guo, C., Pleiss, G., Sun, Y., & Weinberger, K. Q. (Aug. 3, 2017). On calibration of modern neural networks. In International conference on machine learning (pp. 1321-1330). PMLR.

Hendrycks, D., & Dietterich, T. (Mar. 28, 2019). Benchmarking neural network robustness to common corruptions and perturbations. arXiv preprint arXiv:1903.12261.

Hendrycks, D., Zhao, K., Basart, S., Steinhardt, J., & Song, D. (Mar. 4, 2021). Natural adversarial examples. In Proceedings of the IEEE/CVF Conference on Computer Vision and Pattern Recognition (pp. 15262-15271).

Jiang, J., Ananthanarayanan, G., Bodik, P., Sen, S., & Stoica, I. (Aug. 7, 2018). Chameleon: scalable adaptation of video analytics. In Proceedings of the 2018 conference of the ACM special interest group on data communication (pp. 253-266).

Jin, C., & Rinard, M. (Mar. 9, 2020). Manifold regularization for locally stable deep neural networks. arXiv preprint arXiv:2003.04286.

Kang, D., Emmons, J., Abuzaid, F., Bailis, P., & Zaharia, M. (Mar. 7, 2017). Noscope: optimizing neural network queries over video at scale. arXiv preprint arXiv:1703.02529.

Koh, P. W., Sagawa, S., Marklund, H., Xie, S. M., Zhang, M., Balsubramani, A., . . . & Liang, P. (Jul. 1, 2021). Wilds: A benchmark of in-the-wild distribution shifts. In International Conference on Machine Learning (pp. 5637-5664). PMLR.

Krizhevsky, A., Sutskever, I., & Hinton, G. E. (Dec. 3, 2012). Imagenet classification with deep convolutional neural networks. Advances in neural information processing systems, 25.

Lakshminarayanan, B., Pritzel, A., & Blundell, C. (Nov. 4, 2017). Simple and scalable predictive uncertainty estimation using deep ensembles. Advances in neural information processing systems, 30.

Li, Y., Padmanabhan, A., Zhao, P., Wang, Y., Xu, G. H., & Netravali, R. (Jul. 30, 2020). Reducto: On-camera filtering for resource-efficient real-time video analytics. In Proceedings of the Annual conference of the ACM Special Interest Group on Data Communication on the applications, technologies, architectures, and protocols for computer communication (pp. 359-376).

Lin, T. Y., Maire, M., Belongie, S., Hays, J., Perona, P., Ramanan, D., . . . & Zitnick, C. L. (Sep. 6, 2014). Microsoft coco: Common objects in context. In Computer Vision—ECCV 2014: 13th European Conference, Zurich, Switzerland, Proceedings, Part V 13 (pp. 740-755). Springer International Publishing.

Liu, L., Li, H., & Gruteser, M. (Aug. 5, 2019). Edge assisted real-time object detection for mobile augmented reality. In The 25th annual international conference on mobile computing and networking (pp. 1-16).

Liu, W., Anguelov, D., Erhan, D., Szegedy, C., Reed, S., Fu, C. Y., & Berg, A. C. (Oct. 11, 2016). Ssd: Single shot multibox detector. In Computer Vision—ECCV 2016: 14th European Conference, Amsterdam, The Netherlands, Proceedings, Part I 14 (pp. 21-37). Springer International Publishing.

Madry, A., Makelov, A., Schmidt, L., Tsipras, D., & Vladu, A. (Jun. 19, 2017). Towards deep learning models resistant to adversarial attacks. arXiv preprint arXiv:1706.06083.

Minderer, M., Djolonga, J., Romijnders, R., Hubis, F., Zhai, X., Houlsby, N., . . . & Lucic, M. (Dec. 6, 2021). Revisiting the calibration of modern neural networks. Advances in Neural Information Processing Systems, 34, 15682-15694.

Najafi, A., Maeda, S. I., Koyama, M., & Miyato, T. (Dec. 8, 2019). Robustness to adversarial perturbations in learning from incomplete data. Advances in Neural Information Processing Systems, 32.

Nyberg, O., & Klami, A. (May 9, 2021). Reliably calibrated isotonic regression. In Pacific-Asia Conference on Knowledge Discovery and Data Mining (pp. 578-589). Cham: Springer International Publishing.

Otani, A., Hashiguchi, R., Omi, K., Fukushima, N., & Tamaki, T. (Nov. 14, 2022). Performance Evaluation of Action Recognition Models on Low Quality Videos. IEEE Access, 10, 94898-94907.

Paul, S., Rao, K., Coviello, G., Sankaradas, M., Po, O., Hu, Y. C., & Chakradhar, S. (Nov. 6, 2022). Enhancing Video Analytics Accuracy via Real-time Automated Camera Parameter Tuning. In Proceedings of the 20th ACM Conference on Embedded Networked Sensor Systems (pp. 291-304).

Schroff, F., Kalenichenko, D., & Philbin, J. (Jun. 7, 2015). Facenet: A unified embedding for face recognition and clustering. In Proceedings of the IEEE conference on computer vision and pattern recognition (pp. 815-823).

(56)                    References Cited

OTHER PUBLICATIONS

Sinha, D., & El-Sharkawy, M. (Oct. 10, 2019). Thin mobilenet: An enhanced mobilenet architecture. In 2019 IEEE 10th annual ubiquitous computing, electronics & mobile communication conference (UEMCON) (pp. 0280-0285). IEEE.

Tan, M., Pang, R., & Le, Q. V. (Jun. 13, 2020). Efficientdet: Scalable and efficient object detection. In Proceedings of the IEEE/CVF conference on computer vision and pattern recognition (pp. 10781-10790).

Wang, L., & Sng, D. (Dec. 10, 2015). Deep learning algorithms with applications to video analytics for a smart city: A survey. arXiv preprint arXiv:1512.03131.

Wenkel, S., Alhazmi, K., Liiv, T., Alrshoud, S., & Simon, M. (Jun. 25, 2021). Confidence score: The forgotten dimension of object detection performance evaluation. Sensors, 21(13), 4350.

Xie, C., Tan, M., Gong, B., Wang, J., Yuille, A. L., & Le, Q. V. (Jun. 13, 2020). Adversarial examples improve image recognition. In Proceedings of the IEEE/CVF conference on computer vision and pattern recognition (pp. 819-828).

Xie, Q., Luong, M. T., Hovy, E., & Le, Q. V. (Jun. 13, 2020). Self-training with noisy student improves imagenet classification. In Proceedings of the IEEE/CVF conference on computer vision and pattern recognition (pp. 10687-10698).

Zhang, B., Jin, X., Ratnasamy, S., Wawrzynek, J., & Lee, E. A. (Aug. 7, 2018). Awstream: Adaptive wide-area streaming analytics. In Proceedings of the 2018 Conference of the ACM Special Interest Group on Data Communication (pp. 236-252).

Zhang, H., Ananthanarayanan, G., Bodik, P., Philipose, M., & Bahl, P. (Mar. 27, 2017). Live Video Analytics at Scale with Approximation and Delay-Tolerance. In Proceedings of the 14th USENIX Symposium on Networked Systems Design and Implementation (pp. 1-17).

Zhang, H., Yu, Y., Jiao, J., Xing, E., El Ghaoui, L., & Jordan, M. (May 24, 2019). Theoretically principled trade-off between robustness and accuracy. In International conference on machine learning (pp. 7472-7482). PMLR.

* cited by examiner

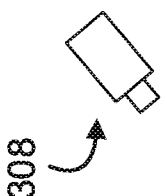
308
306
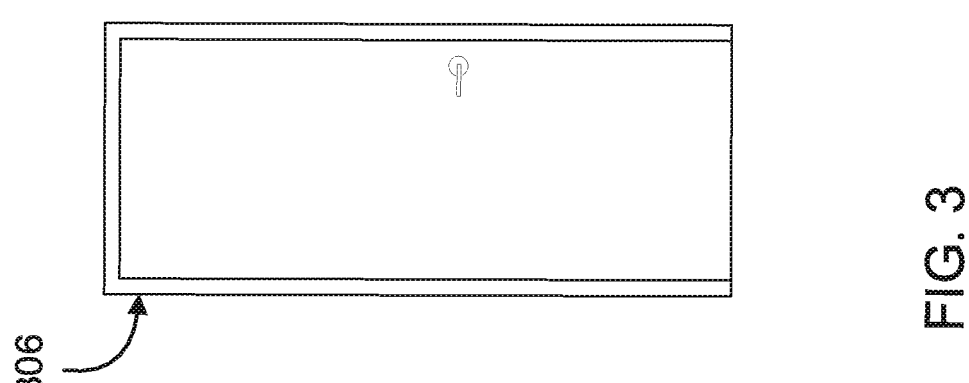
300
304
302
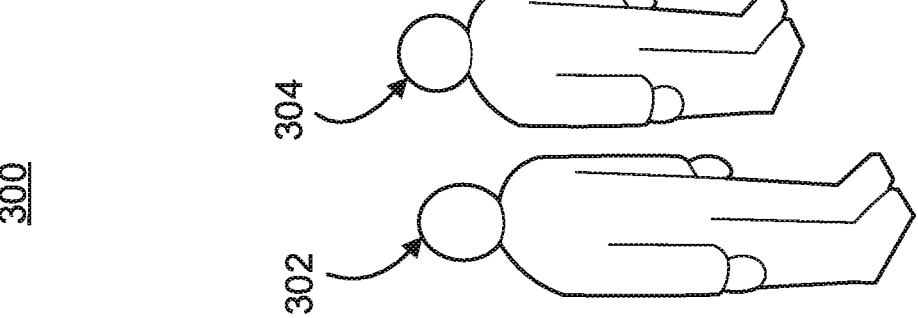
FIG. 3

Figure 5:
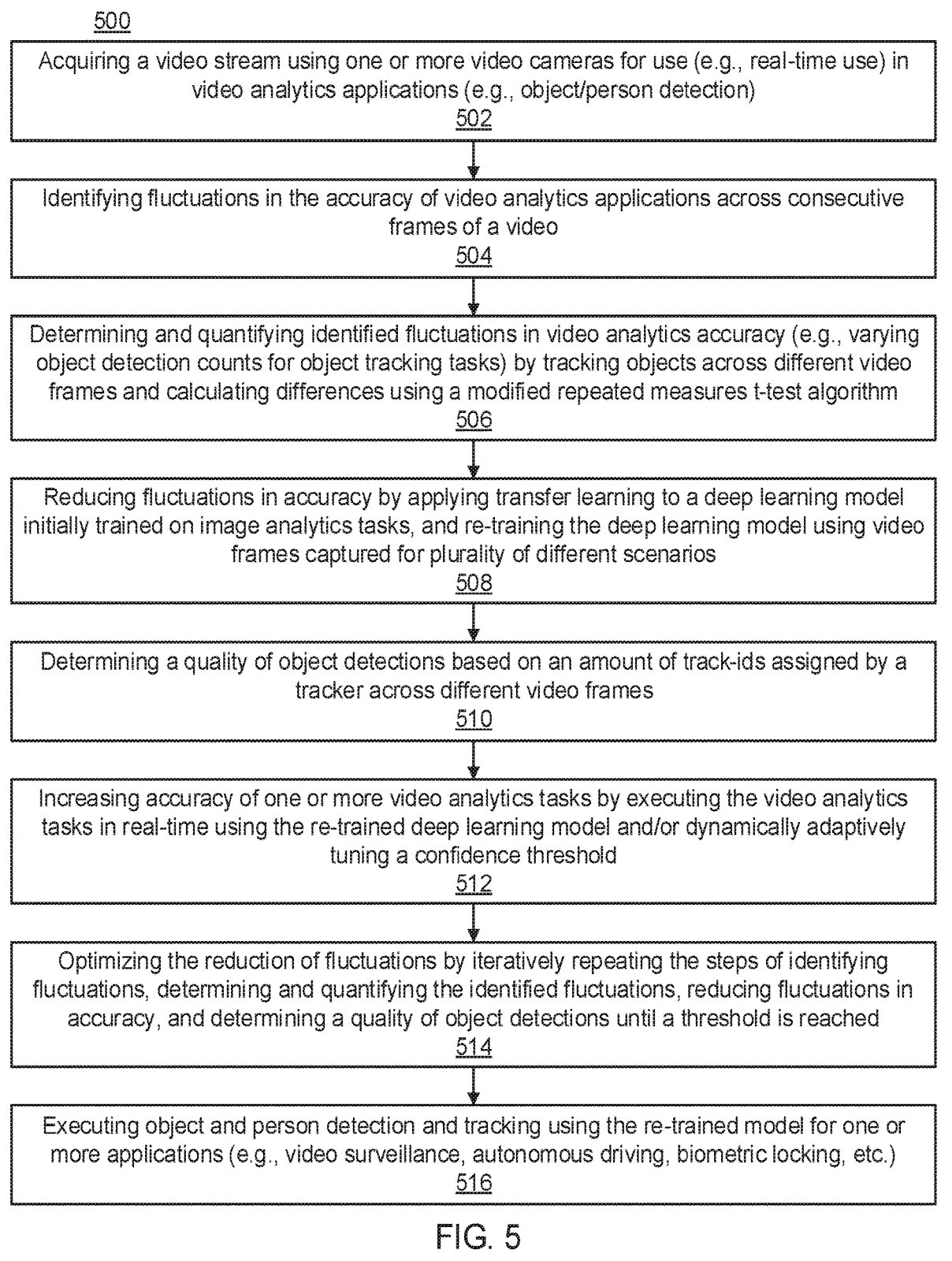

500

Acquiring a video stream using one or more video cameras for use (e.g., real-time use) in video analytics applications (e.g., object/person detection)
502

Identifying fluctuations in the accuracy of video analytics applications across consecutive frames of a video
504

Determining and quantifying identified fluctuations in video analytics accuracy (e.g., varying object detection counts for object tracking tasks) by tracking objects across different video frames and calculating differences using a modified repeated measures t-test algorithm
506

Reducing fluctuations in accuracy by applying transfer learning to a deep learning model initially trained on image analytics tasks, and re-training the deep learning model using video frames captured for plurality of different scenarios
508

Determining a quality of object detections based on an amount of track-ids assigned by a tracker across different video frames
510

Increasing accuracy of one or more video analytics tasks by executing the video analytics tasks in real-time using the re-trained deep learning model and/or dynamically adaptively tuning a confidence threshold
512

Optimizing the reduction of fluctuations by iteratively repeating the steps of identifying fluctuations, determining and quantifying the identified fluctuations, reducing fluctuations in accuracy, and determining a quality of object detections until a threshold is reached
514

Executing object and person detection and tracking using the re-trained model for one or more applications (e.g., video surveillance, autonomous driving, biometric locking, etc.)
516

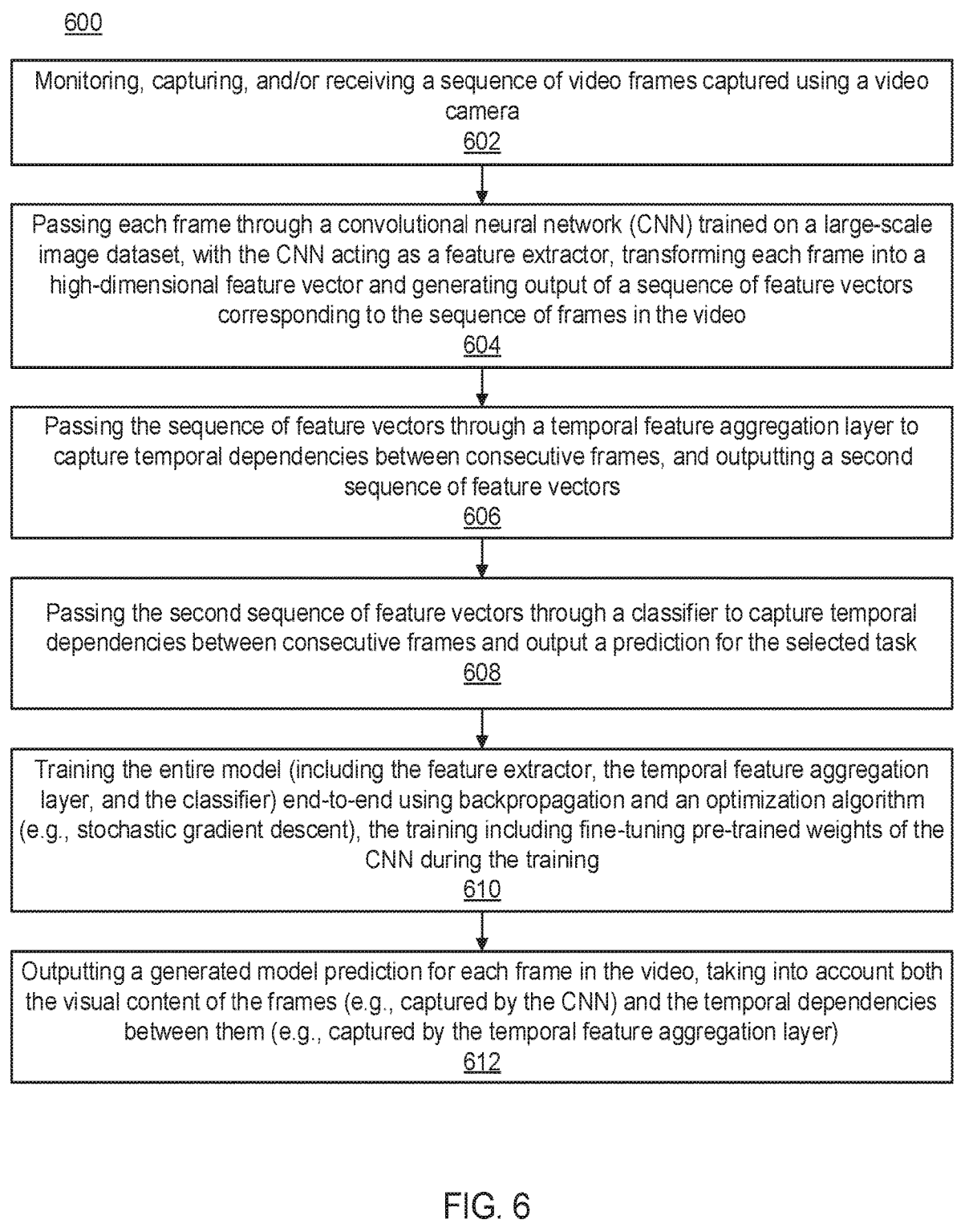

Monitoring, capturing, and/or receiving a sequence of video frames captured using a video camera
602

Passing each frame through a convolutional neural network (CNN) trained on a large-scale image dataset, with the CNN acting as a feature extractor, transforming each frame into a high-dimensional feature vector and generating output of a sequence of feature vectors corresponding to the sequence of frames in the video
604

Passing the sequence of feature vectors through a temporal feature aggregation layer to capture temporal dependencies between consecutive frames, and outputting a second sequence of feature vectors
606

Passing the second sequence of feature vectors through a classifier to capture temporal dependencies between consecutive frames and output a prediction for the selected task
608

Training the entire model (including the feature extractor, the temporal feature aggregation layer, and the classifier) end-to-end using backpropagation and an optimization algorithm (e.g., stochastic gradient descent), the training including fine-tuning pre-trained weights of the CNN during the training
610

Outputting a generated model prediction for each frame in the video, taking into account both the visual content of the frames (e.g., captured by the CNN) and the temporal dependencies between them (e.g., captured by the temporal feature aggregation layer)
612

FIG. 6

VIDEO ANALYTICS ACCURACY USING TRANSFER LEARNING

RELATED APPLICATION INFORMATION

This application claims priority to U.S. Provisional App. No. 63/393,900, filed on Jul. 30, 2022, incorporated herein by reference in its entirety.

BACKGROUND

Technical Field

The present invention relates to improved video analytics accuracy using transfer learning, and more particularly to improving video analytics accuracy for better detection and tracking of objects and faces in a video by retraining a neural network model using transfer learning to reduce fluctuations in accuracy of detection and tracking of objects and faces in consecutive video frames of the video.

Description of the Related Art

Significant advancements in machine learning and computer vision, coupled with the rapid expansion of Internet of Things (IoT), edge computing, and high-bandwidth access networks like 5G, have resulted in widespread adoption of video analytics systems. These systems utilize cameras deployed worldwide to support a wide range of applications in various market segments, including entertainment, health care, retail, automotive, transportation, home automation, safety, and security. Traditional video analytics systems predominantly depend on state-of-the-art (SOTA) deep learning models to analyze and interpret video stream content. It is a common practice to treat a video as a sequence of individual images or frames and apply deep neural network (DNN) learning models, initially trained on images, to similar analytics tasks on videos. The availability of extensive image datasets, such as Common Objects in Context (COCO), has facilitated the training of highly accurate SOTA deep learning models capable of detecting a wide range of objects in images, and conventional systems have worked under the assumption that these models will perform equally well on videos as on images.

However, such conventional video analytics systems exhibit significant fluctuations (e.g., 40% or greater fluctuations) in the accuracy and consistency of video analytics tasks (e.g., object detection, face detection, etc.) across consecutive video frames, rather than remaining essentially the same, even in videos which predominantly exhibit static scenes with minimal activity (e.g., cars or people have negligible or no movement). While the ground truth (e.g., the total number of objects, persons, animals, etc. actually in a video frame) remains essentially constant across consecutive video frames of such predominantly static scenes, conventional video analytics systems exhibit significant, measurable fluctuations in detection counts across consecutive video frames during analytics, and thus provide inaccurate results. These fluctuations of video analytics accuracy are similarly present when performing video analytics tasks for videos with dynamic scenes (e.g., including movement of objects or persons) using conventional systems and methods, and occur using any camera model and for any type or quality of the video analyzed. The adverse impact of these fluctuations across frames causes a reduction in detection count accuracy and thus overall system performance, and extends to multiple video analytics applications, including, for example, those that rely on object or face detection insights for higher-level tasks like object tracking or person recognition.

SUMMARY

According to an aspect of the present invention, a method is provided for increasing accuracy of video analytics tasks in real-time, including acquiring a video using one or more video cameras, and identifying fluctuations in the accuracy of video analytics applications across consecutive frames of the video. The identified fluctuations are quantified by determining an average relative difference of true-positive detection counts across the consecutive frames, and fluctuations in accuracy are reduced by applying transfer learning to a deep learning model initially trained using images, and retraining the deep learning model using video frames captured for a plurality of different scenarios. A quality of object detections is determined based on an amount of track-ids assigned by a tracker across different video frames, and the reducing the fluctuations is optimized by iteratively repeating the identifying fluctuations, the quantifying the identified fluctuations, the reducing the fluctuations in accuracy, and the determining a quality of object detections until a threshold is reached. Model predictions are generated for each frame in the video using the retrained deep learning model for the video analytics tasks.

According to another aspect of the present invention, a system is provided for increasing accuracy of video analytics tasks in real-time, and includes a processor, operatively coupled to a non-transitory computer-readable storage medium, and configured for acquiring a video using one or more video cameras, and identifying fluctuations in the accuracy of video analytics applications across consecutive frames of the video. The identified fluctuations are quantified by determining an average relative difference of true-positive detection counts across the consecutive frames, and fluctuations in accuracy are reduced by applying transfer learning to a deep learning model initially trained using images, and retraining the deep learning model using video frames captured for a plurality of different scenarios. A quality of object detections is determined based on an amount of track-ids assigned by a tracker across different video frames, and the reducing the fluctuations is optimized by iteratively repeating the identifying fluctuations, the quantifying the identified fluctuations, the reducing the fluctuations in accuracy, and the determining a quality of object detections until a threshold is reached. Model predictions are generated for each frame in the video using the retrained deep learning model for the video analytics tasks.

According to another aspect of the present invention, a non-transitory computer readable storage medium including contents that are configured to cause a computer to perform a method for increasing accuracy of video analytics tasks in real-time, including acquiring a video using one or more video cameras, and identifying fluctuations in the accuracy of video analytics applications across consecutive frames of the video. The identified fluctuations are quantified by determining an average relative difference of true-positive detection counts across the consecutive frames, and fluctuations in accuracy are reduced by applying transfer learning to a deep learning model initially trained using images, and retraining the deep learning model using video frames captured for a plurality of different scenarios. A quality of object detections is determined based on an amount of track-ids assigned by a tracker across different video frames, and the reducing the fluctuations is optimized by iteratively repeating the identifying fluctuations, the quantifying the identified fluctuations, the reducing the fluctuations in accuracy, and the determining a quality of object detections until a threshold is reached. Model predictions are generated for each frame in the video using the retrained deep learning model for the video analytics tasks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a diagram illustratively depicting an exemplary video surveillance system, including one or more video cameras, to which the present invention can be applied, in accordance with embodiments of the present invention;

FIG. 5 is a block/flow diagram illustratively depicting a method for increasing accuracy of video analytics tasks in real-time by reducing fluctuations in accuracy of video analytics applications across video frames by retraining a pretrained Deep Neural Network (DNN) using transfer learning and/or adaptive tuning of a confidence threshold, in accordance with embodiments of the present invention;

FIG. 6 is a block/flow diagram illustratively depicting a method for reducing fluctuations in accuracy of video analytics applications across video frames by retraining a pretrained Deep Neural Network (DNN) using transfer learning, in accordance with embodiments of the present invention;

DETAILED DESCRIPTION

Figure 1:
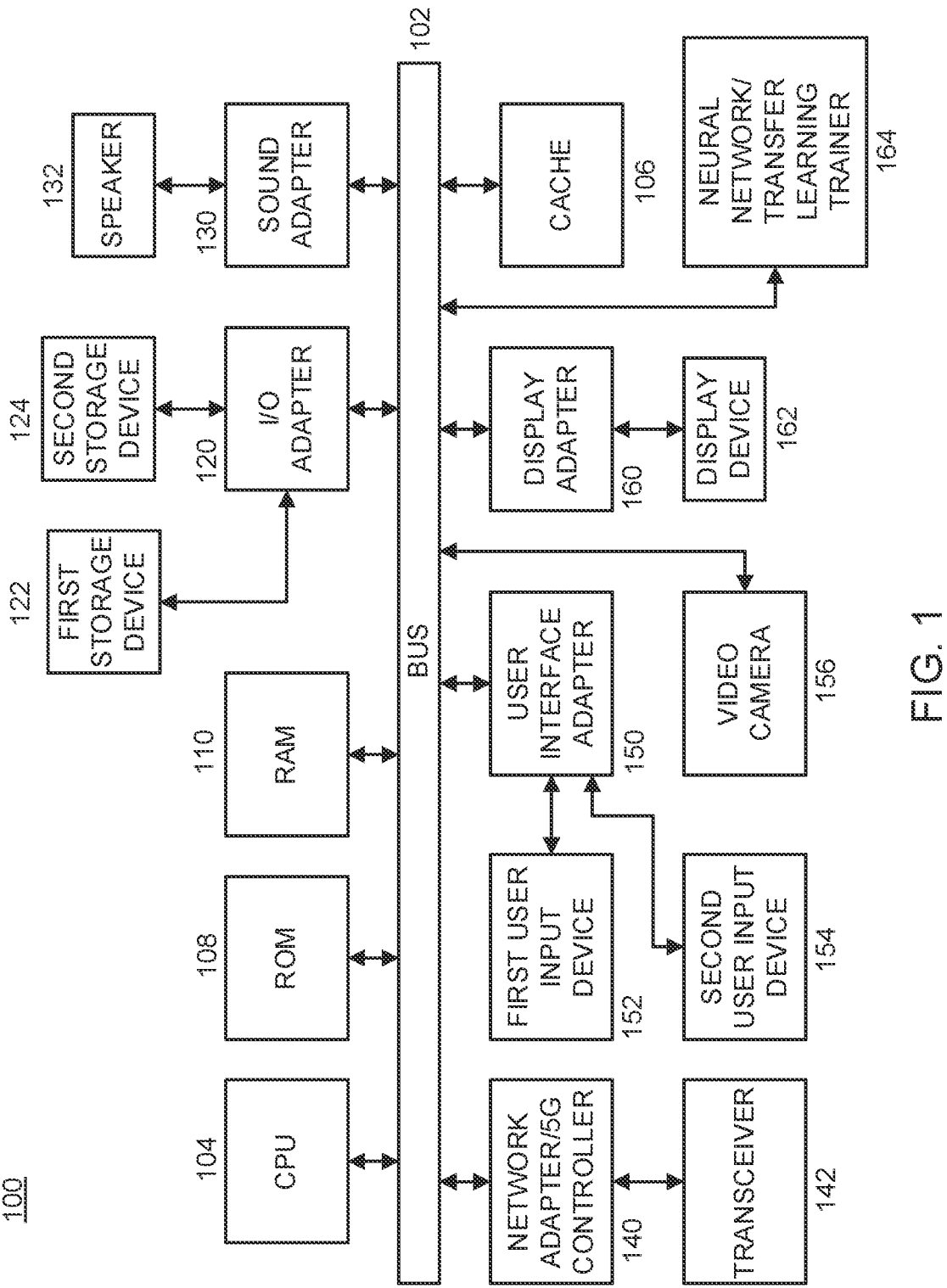
FIG. 1 shows a block diagram illustratively depicting an exemplary processing system to which the present invention may be applied, in accordance with embodiments of the present invention.

In accordance with embodiments of the present invention, systems and methods are provided for improving video analytics accuracy for better detection and tracking of objects and faces in a video by retraining a pre-trained neural network model using transfer learning to reduce fluctuations in video analytics accuracy, and thus, increase accuracy of detection and tracking of objects and faces in consecutive video frames of the video.

Traditional video analytics systems and methods predominantly depend on state-of-the-art (SOTA) deep learning models to analyze and interpret video stream content. It is a common practice to treat a video as a sequence of individual images or frames and apply deep neural network (DNN) learning models, initially trained on images, to similar analytics tasks on videos. The availability of extensive image datasets, such as Common Objects in Context (COCO), has facilitated the training of highly accurate SOTA deep learning models capable of detecting a wide range of objects in images. However, the assumption that these models will perform equally well on videos has proven to be flawed, leading to low accuracy in object detection in video analytics applications.

When performing video analytics applications (e.g., real-time surveillance of an area, object and person detection for autonomous vehicle navigation, facial recognition for unlocking doors, etc.) using conventional systems and methods, the accuracy of video analytics applications fluctuates noticeably across video frames, even in static scenes with no perceivable changes and/or controlled external factors such as video compression, lighting, and angle of view. This inconsistency can be at least in part caused by the dynamic adjustments made automatically to the video camera's parameters to produce visually appealing videos for human vision, inadvertently acting as an "unintentional adversary" for video analytics applications. The slight variations in pixel values between consecutive frames can adversely impact the accuracy of insights derived from video analytics tasks using conventional systems and methods.

Deep neural network models trained on large-scale image datasets are often used for critical video analytics tasks. For instance, video segments from benchmark video datasets featuring cars or persons are analyzed using numerous SOTA DNN models for object detection and face detection tasks. Despite the scenes being predominantly static, conventional systems exhibit noticeable fluctuations in the accuracy of tasks such as object detection or face detection. These fluctuations occur across different camera models and vendors and extend to applications that rely on object or face detection insights for higher-level tasks like object tracking or person recognition.

These fluctuations occur at least in part because successive frames produced by the video camera may look similar visually, but are perceived and analyzed very differently by video analytics applications. It has been observed that a root cause for these fluctuations is the dynamic camera parameter changes that a video camera automatically makes in order to capture and produce a visually pleasing video. The camera inadvertently acts as an "unintentional adversary" because these slight changes in the image pixel values in consecutive frames have a noticeably adverse impact on the accuracy of insights from video analytics tasks that re-use image-trained deep learning models, as in conventional systems and methods. Other causes of the accuracy fluctuations of these SOTA deep neural network models, in particular on predominantly static scenes, have been tested to determine their impact on the fluctuations in performance of image-trained deep neural network models by carefully considering factors external and internal to a video camera.

In various embodiments, external factors can include, for example, environmental conditions (e.g., lighting, fog, rain, etc.), video processing (e.g., video compression, smoothing, etc.), motion of objects or people in the scene, or any other factors which can affect video quality excluding internal camera factors. Internal camera factors for a video camera can include, for example, user-adjustable camera parameters or settings, automatic camera parameter or settings adjustments (e.g., automatic selection and adjustment of parameters including exposure, aperture, focusing, light metering, etc.), or internal image/video processing for improving video quality for viewing by a person, and/or camera modes, in accordance with aspects of the present invention.

Even after controlling and/or eliminating the above-described external and internal factors to attempt to improve accuracy of video analytics applications (e.g., detection count, tracking, etc.), noticeable accuracy fluctuations are still present when using conventional video analytics systems and methods for video analytics, and these fluctuations persist across different deep learning models and different camera brands and models in real-world practice. A cause of these fluctuations was identified as being due to the dynamic camera parameter changes that a video camera automatically makes in order to capture and produce a visually pleasing video. The camera thus acts as an inadvertent "unintentional adversary" because these slight changes in image pixel values in consecutive frames have a noticeably adverse impact on the accuracy of insights from video analytics tasks that re-use image-trained deep learning models. In various embodiments, this detrimental adversarial effect caused by the camera can be addressed and mitigated by transferring knowledge from learning on image analytics tasks to video analytics tasks using transfer learning techniques, in accordance with aspects of the present invention.

In various embodiments, this detrimental adversarial effect on video analytics tasks caused by the video camera can be mitigated using transfer learning techniques to improve learning in video analytics tasks through the transfer of knowledge from learning on image analytics tasks in accordance with aspects of the present invention. Experiments conducted using multiple different camera types and models for a plurality of different video analytics tasks have shown that the inadvertent adversarial effect from the camera can be significantly mitigated by re-training deep learning models using transfer learning. For example, a Yolov5 ("You only look once version 5") model retrained using transfer learning techniques, in accordance with embodiments of the present invention, can significantly reduce fluctuation in object detection across frames. This retraining by transfer learning can lead to better detection and/or tracking of objects or persons (e.g., 40% or fewer mistakes as compared to conventional systems and methods) by mitigating the camera's adversarial effect on deep learning models used for video analytics applications using transfer learning techniques, in accordance with aspects of the present invention.

In various embodiments, retraining a pretrained Deep Neural Network (DNN) using transfer learning and/or adaptive tuning of a confidence threshold can increase accuracy of video analytics applications (e.g., object/person/animal detection and tracking, object/person/animal identification, etc.) in real-time by reducing fluctuations in accuracy of video analytics applications across video frames, in accordance with aspects of the present invention. The present invention outperforms conventional systems and methods with regard to accuracy, processing power requirements, and speed of processing camera video streams using transfer learning techniques for real-time detection and tracking of objects, persons, animals, etc., at least in part because conventional systems fail to account for or mitigate adverse effects of camera settings (internal or external), flicker, compression, and/or environmental factors during video analytics applications. In accordance with various embodiments, the system and method of the present invention can account for and mitigate these adverse effects, thus improving video analytics accuracy across video frames, in accordance with various aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more video cameras 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154, and camera 156 are used to input and output information to and from system 100, in accordance with aspects of the present invention. A neural network/transfer learning trainer 164 can be operatively connected to the system 100 for retraining of a deep neural network using transfer learning to improve accuracy of video analytics tasks, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, 400, 700, and 800, described below with respect to FIGS. 2, 3, 4, 7, and 8, respectively, are systems for implementing respective embodiments of the present invention. Part or all of processing system 100 may be implemented in one or more of the elements of systems 200, 300, 400, 700, and 800, in accordance with aspects of the present invention.

Further, it is to be appreciated that processing system 100 may perform at least part of the methods described herein including, for example, at least part of methods 200, 300, 500, 600, and 800, described below with respect to FIGS. 2, 3, 5, 6, and 8, respectively. Similarly, part or all of systems 200, 300, 400, 700, and 800 may be used to perform at least part of methods 200, 300, 500, 600, 700, and 800 of FIGS. 2, 3, 5, 6, and 8, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
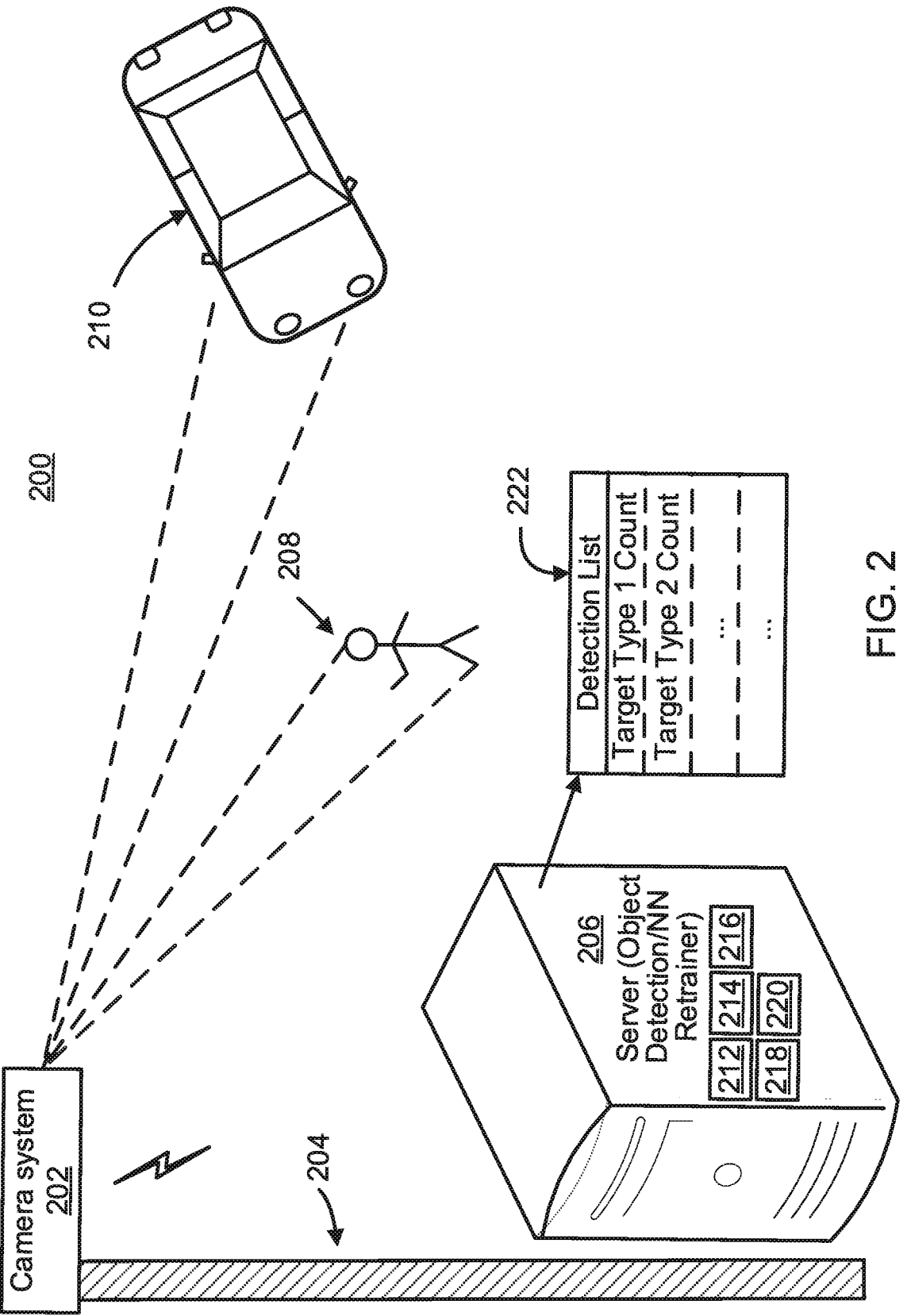
FIG. 2 shows a diagram illustratively depicting a high-level view of a system and method for real-time surveillance and identification of objects and people by increasing accuracy of video analytics applications by reducing object and people detection count fluctuations across video frames using transfer learning and/or adaptive tuning of a confidence threshold, in accordance with embodiments of the present invention.

Referring now to FIG. 2, a high-level system and method 200 for real-time surveillance and identification of objects and people with increased accuracy of video analytics applications (e.g., object/people/animal detection, tracking, identification, etc.) by reducing object and people detection count fluctuations across video frames using transfer learning and/or adaptive tuning of a confidence threshold, is illustratively depicted in accordance with embodiments of the present invention.

In an illustrative embodiment, a camera system 202 can be utilized to monitor an area of interest and/or capture video and/or images for processing for video analytics applications (e.g., object/person/animal detection, tracking, identification, etc.), and can include a wired and/or wireless connectivity device for providing connectivity with one or more computing networks (e.g., Internet, LAN, WAN, etc.), and local or remote computing devices (e.g., server 206, computer for vehicle 210, etc.). While the single camera system 202 is shown in FIG. 2 for the sakes of illustration and brevity, it is to be appreciated that multiple camera systems can be also used, in accordance with aspects of the present invention.

In various embodiments, the camera system 202 can be mounted on a mounting entity 204. For the sake of illustration, the mounting entity 204 is depicted as a pole. While a pole 204 is shown (as a mounting entity) for the sake of illustration, any other mounting entity can be used, as readily appreciated by one of ordinary skill in the art given the teachings of the present invention provided herein. For example, the camera system 202 can be mounted in or on any of the following: a building, a tree, a drone, etc., in accordance with aspects of the present invention, noting that the preceding examples of various mounting entities are merely illustrative. The camera system 202 can be a wireless camera system having its own antenna(s) or can use one or more antennas included on the pole 204 (or other mounting entity (e.g., building, drone, etc.) to which the camera system 202 is mounted or proximate).

In various embodiments, the system and method 200 can include a local or remote computing device, depicted herein for ease of illustration as a server 206, for processing video captured by the camera system 202 for any or a plurality of video analytics tasks (e.g., object/person/animal detection, tracking, identification, etc.). It is to be appreciated that any of a plurality of types or amount of computing devices can be used in block 206, as readily appreciated by one of ordinary skill in the art given the teachings of the present invention provided herein. For example, the computing device 206 can be one or more of any of the following: a server, a main-frame, a network of servers, a cloud, a personal computer, etc., in accordance with aspects of the present invention, noting that the preceding examples of various computing devices 206 are merely illustrative.

In various embodiments, the server 206 can perform video analytics applications, including detecting, tracking, and identifying objects (e.g., vehicle 210) and people 208 across multiple frames of a video captured by the camera system 202, with reduced fluctuations in accuracy of such video analytics applications across video frames by retraining a pretrained Deep Neural Network (DNN) using transfer learning and/or adaptive tuning of a confidence threshold, in accordance with aspects of the present invention.

In various embodiments, the system and method 200 can accurately perform video analytics applications, including, for example, detection, tracking, and identification of objects, people, and animals in an area of interest in real time, and can transmit results of such video analytics applications to any of a plurality of computing devices for use in any of a plurality of application, including, for example, providing access to secure areas (e.g., using facial recognition), tracking a number of people in a particular area, detecting a particular person in a crowd, etc., in accordance with aspects of the present invention.

Such detection, tracking, and/or facial recognition can be with respect to a secured object such as, for example, a facility. The facility can be a secured facility or a non-secured facility. In one embodiment, the facility can be a secured facility implemented as an airport. Of course, other facilities (e.g., mass transit hub, sports complex, etc.) can also be monitored for detection and tracking of people 208 or objects 210, for facial recognition tasks, etc., in accordance with aspects of the present invention.

The server 206 can be located remote from, or proximate to, the camera system 202, and can include a processor 212 operatively coupled to a memory 214, a networking device 216, a detector/quantifier 218 configured to detect and quantify fluctuations in video analytics accuracy across video frames, and a neural network transfer learning retrainer/confidence threshold tuner 220 configured for increasing accuracy of video analytics tasks in real-time by reducing fluctuations in accuracy of video analytics applications across video frames by retraining a pretrained Deep Neural Network (DNN) using transfer learning and/or adaptive tuning of a confidence threshold, in accordance with aspects of the present invention.

In an illustrative embodiment, the server 206 can be configured to perform object 210 and person 208 counts for a particular area of interest (e.g., train station to determine daily traffic) based on video data received from the camera system 202 by (e.g., the networking device 216) of the server 206 to identify and provide a list 222 of object 210 and person 208 counts in the area of interest. In facial recognition embodiments, the server 206 can identify and store a list 222 of a plurality of different faces captured by the video camera and/or can store or access a database of known faces (e.g., person to grant/deny access for a facility) for comparison with the faces captured by the video camera and stored in the list 222, in accordance with aspects of the present invention. Such video analytics/facial recognition tasks can involve one or more actions performed responsive to the list 222, as readily appreciated by one of ordinary skill in the art. For example, an alert (local and/or remote) can be provided, one or more doors and/or windows can be closed and locked to secure the person 208 or vehicle 210 within a specific area or to keep the person 208 from accessing a specific area, a person containment procedure (e.g., all doors to a room closing and locking with person inside) can be automatically performed, etc., in accordance with aspects of the present invention.

Accordingly, some exemplary suitable environments to which the present invention can be applied can include any environments where detection, tracking, and/or identification of objects, people, animals, etc. can prove useful (e.g., mass transit hubs, border crossings, subways, transportation hubs, airports, ship ports, sports facilities, etc.), in accordance with aspects of the present invention. It is to be appreciated that the preceding environments are merely illustrative and, thus, other environments can also be used, while maintaining the spirit of the present invention.

In an illustrative embodiment, the system and method 200 can be used for object/people detection tasks, noting that such object detection is one of the most common tasks in video analytics pipelines. For example, detecting cars or people in real-time can be critical for many real-world applications, including, for example, video surveillance, retail, health care monitoring and intelligent transportation systems. It is to be appreciated that although object/people detection tasks are discussed hereinbelow for ease of illustration as an example of a particular video analytics task performed by the present invention, object/person detection is merely one of one of a plurality of video analytics tasks capable of being performed and improved by the present invention, as would be appreciated by one of ordinary skill in the art.

Although conventional systems and methods for video analytics applications can detect objects 210 and people 208 in a video, experiments have shown that conventional video analytics systems, which utilize widely-used object detectors (e.g., YOLOv5 (small and large variant), EfficientDet-v0, and EfficientDet-v8) for analysis of videos for detection of objects 210 and people 208, exhibit low accuracy in practice when compared to the ground truth (e.g., the actual number of cars and people at different times (i.e., frames) in the video). The detector prediction by the deep learning model (e.g., number of cars and people detected by the deep learning model at different times (e.g., frames) in the video), can be significantly lower than the ground truth for all considered object detectors using conventional systems and methods. It is notable that light-weight models (e.g., Yolov5—small or Yolov5—large) exhibit a much higher comparative range of detection fluctuations than heavier-weight models (e.g., EfficientDet), but the heavier-weight deep learning models require significantly more computing resources than the light-weight models in real-world utilization for video analytics tasks.

It is notable that the behavior of a Deep Neural Network (DNN) model can be deterministic in the sense that if a frame is processed multiple times by the DNN model, then the DNN inferences are identical, and similar consecutive frames should produce similar results. However, conventional systems and methods exhibit low video analytics accuracy across consecutive frames during processing using a DNN model in practice. In accordance with various embodiments, internal and external factors to a video camera that can cause accuracy fluctuations in video analytics applications for consecutive video frames can be identified and/or mitigated to improve accuracy of any of a plurality of video analytics applications by the server 206, in accordance with aspects of the present invention.

In various embodiments, camera external factors that can affect the quality of the frames of a video processed by the DNNs during video analytics tasks can include, for example, motion in the field of view of the camera 202, which can affect the quality because of blurring caused by the movement of objects, lossy video compression methods (e.g., H.264, AV1, VP9, etc.), in which the quality of decoded frames can noticeably differ from the pre-compression frames, and environmental conditions (e.g., lighting, fog, camera angle, etc.).

In accordance with various embodiments, an illustrative example of an environmental lighting condition which can cause reduction in video analytics accuracy is the flicker exhibited by fluorescent lighting, which can thus affect the quality of frames captured by the camera 202, in addition to contributing to detrimental fluctuations in the analytics accuracy of video analytics tasks, even though most people cannot notice the flicker in fluorescent lights, at least in part due to the flicker rate of approximately 120 cycles per second (120 Hz) being generally imperceptible by the human eye. In some embodiments, motion of objects or people in a video can cause detrimental fluctuations in video analytics accuracy across video frames (e.g., because of blurring caused by the movement of objects), and eliminating motion by, for example, utilizing still frames from a video stream captured by a video camera for executing video analytics tasks. In some embodiments, detection fluctuation of objects and people for video analytics applications can be reduced by eliminating video compression by fetching uncompressed frames directly from the camera 202 instead of fetching a compressed video stream and decoding the stream to obtain frames that can be processed by a DNN model, in accordance with aspects of the present invention.

In various embodiments, eliminating compression in a video can reduce the adverse effect on accuracy fluctuations, and can improve accuracy and results of deep learning models, in accordance with aspects of the present invention. This improvement can be shown by an analyzing the detection counts with and without compression by using the t-test for repeated measures. For example, let A be the sequence of true-positive object detection counts (per frame) for the experiment where video compression is used. Let B be the sequence of true-positive object detection counts for the case when no compression is used. A third sequence D can be computed as a sequence of pair-wise differences between the true-positive object count without compression and with compression (e.g., B−A).

Essentially, the use of difference scores converts a two-sample problem with A and B into a one-sample problem with D. Our null hypothesis states that compression has no effect on object detection counts (and we hypothesize a population mean of 0 for the difference scores). However, in an experiment with a sample size of 200 frames showed that we can reject the null hypothesis at the 0.01 level of significance (99% confidence), suggesting that the elimination of compression does reduce the accuracy fluctuations. Similar results were observed for sample sizes of 100 and 1000 frames. While the above-discussed t-test measures the statistical difference between two distributions, it does not reflect on the fluctuations observed in repeated measures or multiple frames (e.g., group of frames, consecutive frames, temporally separated frames, etc.) in a video.

In various embodiments, the server 206 can quantify the observed fluctuations across a multiple video frames using the following novel metrics: (1) Equation F2 can quantify the observed fluctuations by $$\frac{\|tp(i) - tp(i+1)\|}{\text{mean}(gt(i), gt(i+1))}$$

for frame i, where tp(i), gt(i) are true positive object detection count and ground-truth object count respectively on frame i (on a moving window of 2 frames), and (2) Equation F10 which is defined as $$\frac{\|\max(tp(i), \dots, tp(i+9)) - \min(tp(i), \dots, tp(i+9))\|}{\text{mean}(gt(i), \dots, gt(i+9))}$$

(on a moving window of 10 frames), in accordance with aspects of the present invention. By eliminating video compression (e.g., by fetching uncompressed frames directly from the camera 202, the maximum variation in object count on a static scene can be reduced from 17.4% to 13.0% (F2)

and from 19.0% to 17.4% (F10), showing a quantified improvement in video analytics accuracy and thus the results of deep learning models, in accordance with aspects of the present invention.

Eliminating light flickering in addition to motion and compression can reduce the maximum (F2) and (F10) variations from 13.0% to 8.7% and 17.4% to 13.0% respectively, quantifiably showing that after eliminating motion and video compression, fluorescent light with flicker continues to have an adverse effect on video analytics accuracy fluctuations.

In various embodiments, as described above, the system and method 200 can improve object and person detection results by eliminating motion, video compression and flicker. However, even after controlling for motion, video compression and flickering light, noticeable fluctuations in object detection counts still remain, and are notably present when using multiple different camera models from different vendors and using different deep learning models. Thus, in some embodiments, internal camera settings causing fluctuations in video analytics accuracy can be identified and/or mitigated in accordance with aspects of the present invention.

Various auto-parameter setting in modern cameras can have an adverse effect on video from a video camera 202 for use for video analytics applications. Along with exposing endpoints to retrieve streaming videos (e.g., RTSP stream URL), IP cameras can also expose APIs to set various camera parameters (e.g., VAPIX API for Axis camera models). These camera settings can change the quality of images and video captured and produced by the camera. Camera vendors expose these APIs because they do not know in advance which environment their camera would be utilized, or what camera settings would be ideal for that environment. Therefore, camera settings are generally set by the manufacturer to default values, and end users can then determine what settings would work best for their environment.

In practice, there are essentially two types of camera settings that are exposed by camera vendors. Firstly, are Type 1 parameters, which can include parameters which affect the manner in which raw images are captured (e.g., exposure, gain, shutter speed, etc.). These parameters generally can be adjusted automatically by the camera with little or no interaction or control by end users, and only allow end users to set maximum value. However, within a range of this value, the camera can internally change the settings dynamically to produce a visually pleasing video output for the human eye. Hereinafter such parameters will be referred to as automated parameters (AUTO) for ease of illustration. Secondly, are Type 2 parameters, which can include parameters which affect processing of raw data in order to produce the final frame (e.g., image specific parameters such as brightness, contrast, sharpness, color saturation, and video specific parameters such as compression, GOP length, target bitrate, FPS). For these parameters, camera vendors often expose fine control to end users, who can set a specific value for such parameters. Hereinafter such parameters will be referred to as non-automated parameters (NAUTO) for ease of illustration. The distinction between AUTO and NAUTO parameters can be useful for identifying and adjusting camera internal factors causing adverse video analytics accuracy fluctuations across frames, in accordance with aspects of the present invention.

A main purpose of a video camera is to capture videos, rather than still images, for viewing by human eyes. Hence, irrespective of how the scene in front of the camera looks (e.g., whether the scene is static or dynamic), a video camera always tries to capture a video, which assumes changes in successive frames. To capture a visually pleasing and smooth (e.g., to human eyes) video, the camera tries to automatically determine the optimal exposure time or shutter speed. High shutter speed (e.g., low exposure time) can freeze motion in each frame, resulting in very crisp individual images. However, when such frames are played back at usual video frame rates, it can appear as hyper-realistic and provide a very jittery, unsettled feeling to the viewer in practice. However, low shutter speed can cause moving objects to appear blurred, and can builds up noise in the capture of the video. To maintain an appropriate amount of motion blur and noise in the capture, video cameras can have another setting called gain, which indicates the amount of amplification applied to the capture. For example, a high gain can provide better images in a low-light scenario but can also increase the noise present in the capture. For these reasons, the optimal values of AUTO parameters like exposure and gain are internally adjusted by the camera to output a visually pleasing smooth video. Thus, it has been identified that video capture is fundamentally different from still image capture and the exact values of exposure and gain used by the camera for each frame are not known to end users or analytics applications running on the video output from the camera. This loose control over maximum shutter time and maximum gain parameters can be a major cause for fluctuations in video analytics accuracy, and can cause an unintentional adversarial effect for the camera system 202, and thus, a detrimental effect on accuracy of video analytics tasks.

It is noted that SOTA object detectors (e.g., Yolov5 or EfficientDet) are trained on still image datasets (e.g., COCO and VOC datasets), and it has been observed by experimentation that the accuracy of insights from such deep learning models fluctuate significantly when used for video analytics tasks. This suggests that deep learning models trained on still image datasets are not capable of being directly used for accurate results for video analytics tasks.

In various embodiments, the system and method 200 can mitigate the accuracy fluctuations in video analytics tasks due to the use of image-trained DNN models by retraining models trained using images for extracting insights from videos using video frames that are captured under a plurality of different scenarios. As an illustrative example, transfer learning can be executed by a neural network transfer learning retrainer/confidence threshold tuner 220 to train a Yolov5 model using a plurality of videos captured under different scenarios, in accordance with aspects of the present invention. These videos can contain objects from person and vehicle super-category (e.g., including car, truck, bus, train, etc. categories), captured by the cameras at different deployment sites (e.g., traffic intersection, airport, mall, etc.) during different times-of-the-day (e.g., day, afternoon, night) and also under different weather conditions (e.g., rainy, foggy, sunny). As an illustrative example, assume a total of 34K consecutive frames have been extracted from these video snippets, and these frames form a training dataset.

In various embodiments, the retrainer 220 can execute transfer learning from images to videos for training, in accordance with aspects of the present invention. In some embodiments, rather than using independent images or synthetically transformed images for training (as in conventional systems and methods), real video frames, which can take into account the distribution shift observed in practice for video analytics, can be utilized for training by the retrainer 220, in accordance with aspects of the present invention.

In this illustrative embodiment, it can be assumed that the first 23 modules (corresponding to 23 layers) of a deep learning model can be initialized using weights from COCO-trained Yolov5 model, and these weights can be frozen. In some embodiments, during training, only the weights in the last detect module are updated (noting that in other embodiments the weights can be updated in any appropriate manner, as appreciated by those of ordinary skill in the art. For the transfer learning, a learning rate of 0.01 with a weight decay value of 0.0005 was utilized in this exemplary embodiment. A Yolov5 model can be utilized, and can be trained on, for example, a NVIDIA GeForce RTX 2070 GPU server for a predetermined epoch amount and batch size (e.g., 50 epochs with a batch size of 32). In real-world practice, this lightweight training can significantly reduce processing power requirements and increase detection speed as compared to conventional systems and methods. In this exemplary embodiment, the transfer learning training can be completed using only 1.6 GB GPU memory, and can finish 50 epochs in less than 1.5 hours, which is a significant increase of speed while using less processing power as compared to conventional systems and methods.

In various embodiments, the transfer learning retrained Yolov5 model can be utilized to detect vehicles 210 and people 208 in an area of interest, and shows a large improvement in detection counts (as compared to conventional systems and methods) due at least in part to the utilization of the transfer learning trained model (e.g., Yolov5) for video analytics tasks, in accordance with aspects of the present invention. A comparison of the sequence of object detection counts for the original Yolov5 model (e.g., trained on images with no transfer learning) and the transfer-learning trained Yolov5 model, as in the present invention, can be performed by using a t-test for repeated measures. Then, the size of the beneficial effect due to transfer-learning can be determined (e.g., using equation F2 and/or F10). The results show that at a 0.01 level of significance, the improvement is 2.32 additional object detections (e.g., 14.3% improvement over the mean detections of the original Yolov5 model). For this experiment, the camera can have parameters set for automatic adjustment (e.g., AUTO) of camera parameters to produce a visually pleasing video, but the transfer-learning trained Yolov5 detector was able to detect more objects than when using the image trained model (as utilized by conventional systems and methods) despite the unintentional adversarial effect of the camera caused by the AUTO settings, in accordance with aspects of the present invention.

In various embodiments, in practical deployments of video analytics systems that operate 24×7 in real-world environments, it is difficult to control motion or environmental conditions, and the default video compression settings also vary from camera to camera, and can be unknown to users. Thus, although compensating for motion, environmental conditions, and video compression do improve the accuracy of video analytics applications, the largest improvement, and the most practical for use in real-world, dynamic environments, in particular with unknown variables (e.g., video compression rate for a camera), can be achieved using the transfer learning trained DNN model, in accordance with aspects of the present invention.

In various embodiments, experimental results show that the true-positive object detections by the transfer-learning trained Yolov5 model show significantly less range of fluctuations than the original Yolov5 model (e.g., trained on images). A comparison of the sequence of object detection counts for the original Yolov5 model (e.g., trained on images with no transfer learning) and the transfer-learning trained Yolov5 model, as in the present invention, can be performed by using a t-test for repeated measures. Then, the size of the beneficial effect due to transfer-learning can be determined (e.g., using equation F2 and/or F10). The results show that at a 0.01 level of significance, the improvement is 1 additional object detection (e.g., 9.6% improvement over the mean detections due to the original Yolov5 model). The newly transfer learning trained Yolov5 model can reduce the maximum variation of correctly detected object counts from 47.4% to 33.2% (F10), and 42.1% to 32.5% (F2), which is a significant improvement over conventional systems and methods, in accordance with aspects of the present invention.

Generally, object trackers (e.g., MOT SORT tracker) assign the same track-id to an object appearing in contiguous frames, and if an object is not detected in a frame, then the object's track is terminated. If the object is detected again in subsequent frames, a new track-id can be assigned to the object. In some embodiments, for illustrative purposes, it can be assumed that the number of track-ids assigned by a tracker can be an indicator of the quality of object detections. Experimental results show that a tracker reported 157 track-ids when the original Yolov5 model was used for detecting objects in a video with movement. In contrast, the same tracker reported 94 track-ids when the transfer-learning trained Yolov5 model was used (i.e., 40.1% fewer mistakes in tracking), which shows significant, quantifiable improvement. The ground truth for this example can be assumed to be 29 tracks, and experimental results show that the transfer-learning based Yolov5 model leads to significantly better performance on object tracking tasks in practice, in accordance with aspects of the present invention.

In some embodiments, a confidence threshold can be adaptively tuned based on a difficulty level to detect in particular frames, and the confidence threshold will be described in further detail herein below with reference to FIG. 5.

Referring now to FIG. 3, with continued reference to FIG. 2, a diagram showing a high-level view of an exemplary video surveillance and security system 300, including one or more video cameras 308, is illustratively depicted in accordance with embodiments of the present invention.

In an illustrative embodiment, a facility (e.g., an office, hospital, etc.) can perform object and person tracking using the video surveillance and security system 300, in accordance with aspects of the present invention. The video surveillance and security system 300 can include a video processing system similar to 206, as described with reference to FIG. 2 herein above. The video surveillance and security system 300 can deploy one or more video cameras 308 (hereafter "camera") in, for example, a hallway, to monitor the area. The camera 308 can monitor the hallway for security purposes. The video acquired using the camera 308 can be analyzed using a transfer learning retrained DNN to increase accuracy of video analytics applications, including, for example, facial detection/identification, in accordance with aspects of the present invention. This can allow the video surveillance and security system 300 for a plurality of real-world tasks. For example, the video surveillance and security system 300 can unlock one or more doors 306 (hereafter "door") when a known user 302 approaches the door 306. Though the door 306 may not have an access panel for entry, it can be unlocked by the video security system 300 when the known user 302 approaches the door 306. The video processing system 206 can recognize a known user 302 even if the known user 302 is next to another user 304 by utilizing, the transfer learning retrained DNN for increased accuracy of such video analytics tasks, in accordance with aspects of the present invention. It is to be appreciated that the preceding description utilizing the present invention in an office environment is merely illustrative and, thus, the video surveillance and security system 300 can be deployed in any sort of other environments, while maintaining the spirit of the present invention.

In some embodiments, the video surveillance and security system 300 can be utilized for facial detection/recognition tasks, which can be critical to many real-world applications (e.g., identifying a person of interest in airports, hospitals or arenas, authenticating individuals based on face-recognition for face-based payments, etc.), in accordance with aspects of the present invention. Experimental results show that the number of faces detected by conventional DNN models is significantly lower than the ground truth, and even though the ground truth barely changes, there is a significant fluctuation in the number of detections in consecutive frames using conventional systems and methods. Conversely, experimental results of a number of object and/or faces using a transfer learning retrained DNN, significantly and quantifiably reduces such detection fluctuations, as described in further detail herein above with respect to FIG. 2, in accordance with aspects of the present invention.

Figure 4:
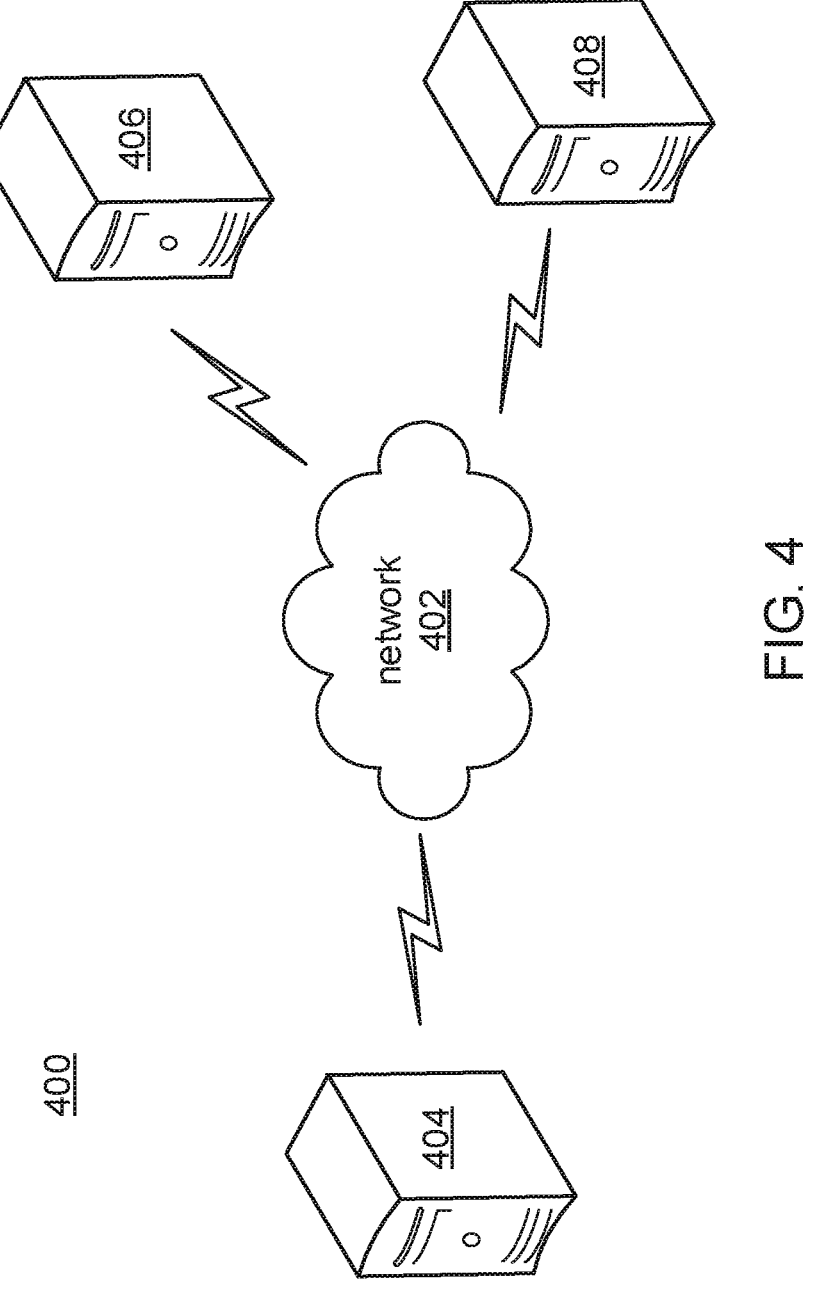
FIG. 4 shows a diagram illustratively depicting a high-level view of an exemplary interconnected computing network to which the present invention can be applied, in accordance with embodiments of the present invention.

Referring now to FIG. 4, a diagram showing a high-level view of an exemplary environment 400, including an interconnected computing network 402 to which the present invention can be applied, is illustratively depicted in accordance with embodiments of the present invention. The elements shown relative to FIG. 4 are set forth for the sake of illustration. However, it is to be appreciated that the present invention can be applied to other network configurations as readily contemplated by one of ordinary skill in the art given the teachings of the present invention provided herein, while maintaining the spirit of the present invention.

In some embodiments, the computing network 402 can include at least a set of computer processing systems 404, 406, 408. The computer processing systems 404, 406, 408 can be any type of computer processing system including, but not limited to, servers, workstations, desktops, laptops, tablets, cellphones, smart phones, media playback devices, and so forth, in accordance with aspects of the present invention. For the sake of illustration, the computer processing systems 404, 406, 408 can each represent a computer server device.

In the embodiment shown in FIG. 4, the elements thereof are interconnected by a network 402. However, in other embodiments, other types of connections can also be used in accordance with aspects of the present invention. Additionally, one or more elements in FIG. 4 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 500 are readily determined by one of ordinary skill in the art, given the teachings of the present invention provided herein, while maintaining the spirit of the present invention.

Referring now to FIG. 5, a diagram showing a method 500 for increasing accuracy of video analytics tasks in real-time by reducing fluctuations in accuracy of video analytics applications across video frames by retraining a pretrained Deep Neural Network (DNN) using transfer learning and/or adaptive tuning of a confidence threshold, is illustratively depicted in accordance with embodiments of the present invention.

In various embodiments, a video/video stream can be acquired using one or more video cameras for use (e.g., real-time use) in video analytics applications (e.g., object/person detection) in block 502. Fluctuations in the accuracy of video analytics applications across consecutive frames of a video can be identified in block 504. In block 506, identified fluctuations can be quantified by determining an average relative difference between frames (e.g., consecutive frames) as follows: Equation F2 can quantify the observed fluctuations by $$\frac{\|tp(i) - tp(i + 1)\|}{\text{mean}(gt(i), gt(i + 1))}$$

for frame i, where tp(i), gt(i) are true positive object detection count and ground-truth object count respectively on frame i (on a moving window of 2 frames), and (2) Equation F10 can quantify the observed fluctuations by $$\frac{\|\max(tp(i), \dots, tp(i + 9)) - \min(tp(i), \dots, tp(i + 9))\|}{\text{mean}(gt(i), \dots, gt(i + 9))}$$

(on a moving window of 10 frames), in accordance with aspects of the present invention. It is to be appreciated that the above equations can be scaled to any amount of frames, and the above amounts are presented for illustrative purposes, in accordance with aspects of the present invention.

In some embodiments, fluctuations in accuracy can be reduced by applying transfer learning to a deep learning model initially trained on image analytics tasks, and re-training the deep learning model using video frames captured for plurality of different scenarios in block 508. In block 510, a quality of object detections can be determined based on an amount of track-ids assigned by a tracker across different video frames. An accuracy of video analytics tasks (e.g., object detections) can be increased by executing the video analytics tasks in real-time using the re-trained deep learning model and/or dynamically adaptively tuning a confidence threshold in block 512, in accordance with aspects of the present invention.

In various embodiments, the dynamic adaptive tuning of a confidence threshold in machine learning models in block 512 can significantly improve prediction accuracy, and can include adjusting a confidence threshold, analyzing a difficulty level, and filtering predictions, in accordance with aspects of the present invention. The confidence threshold adjusting can set an initial confidence threshold value for a machine learning model, and this threshold value can be used to distinguish between comparatively high-confidence and low-confidence predictions made by the model.

A difficulty level analysis can be performed to assess the comparative difficulty level associated with detection in a certain frame. This could be based on various factors, including, for example, the complexity of the data, the amount of data, the variability of the data, or any other factor that may affect the model's ability to make accurate predictions. Based on the assessed difficulty level, the confidence threshold can dynamically adjust the confidence threshold value. For frames with a comparatively higher difficulty level, the confidence threshold value may be increased, thereby reducing the likelihood of accepting low-confidence mispredictions. Conversely, for frames with a comparatively lower difficulty level, the confidence threshold value may be decreased, thereby increasing the likelihood of accepting high-confidence predictions.

Prediction filtering can be performed in block 512, which can filter out particular predictions made by the machine learning model based on the adapted confidence threshold value. For example, predictions with a confidence level below the adapted threshold value can be filtered out as low-confidence mispredictions, while predictions with a confidence level above the adapted threshold value can be accepted as high-confidence predictions, in accordance with aspects of the present invention. In this way, the present invention can further improve the prediction accuracy (e.g., of a transfer learning retrained model) and overall performance of the original machine learning model and the transfer learning retrained model by adjusting the confidence threshold in machine learning models based on the difficulty level associated with detection in a certain frame, thereby providing more reliable and accurate results, in accordance with aspects of the present invention.

In block 514, the reduction of fluctuations can be optimized by iteratively repeating the steps of identifying fluctuations, determining and quantifying the identified fluctuations, reducing fluctuations in accuracy, and determining a quality of object detections until a threshold is reached. Object and person detection and tracking with increased speed and accuracy can be performed in block 516 using the re-trained model for one or more applications (e.g., video surveillance, autonomous driving, biometric locking, etc.), in accordance with aspects of the present invention Referring now to FIG. 6, a diagram showing a method 600 for reducing fluctuations in accuracy of video analytics applications across video frames by retraining a pretrained Deep Neural Network (DNN) using transfer learning, is illustratively depicted in accordance with embodiments of the present invention.

Transfer learning is a machine learning technique where a pre-trained model can be adapted for a different but related problem. In various embodiments, a deep learning model (e.g., YOLOv5 COCO model), initially trained on an image dataset (e.g., COCO), can be retrained using video frames to enhance its performance on video analytics tasks. This approach can leverage the model's existing knowledge gained from the image dataset and can apply it to the video domain, thereby reducing the computational resources and time required for training from scratch as opposed to retraining, in accordance with aspects of the present invention. It is to be appreciated that although the specific YOLOv5 COCO model is discussed herein for illustrative purposes, the present principles can be applied to any sort of deep learning model in accordance with various embodiments of the present invention.

In various embodiments, improved video analytics performance (as quantifiably compared to conventional systems and methods) can be achieved by retraining models pretrained on images (e.g., YOLOv5 COCO model) using video frames for the retraining by applying transfer learning to adapt the model to the specific characteristics of video data, thereby enhancing its accuracy and consistency in video analytics tasks, in accordance with aspects of the present invention. The retraining process can involve several steps, including, for example, extracting video frames from the video dataset, and utilizing these frames as the new training data for the YOLOv5 COCO model. The extraction can be performed at a fixed frame rate or adaptively based on the content changes in the video. The extracted frames can be pre-processed to match the input requirements of the YOLOv5 COCO model, and this pre-processing can include one or more of resizing the frames to required/specified dimensions, normalizing the pixel values, and augmenting the data to increase the diversity of the training set, in accordance with aspects of the present invention.

In some embodiments, the YOLOv5 COCO model can then be retrained using the pre-processed frames in block 610. The retraining process can include fine-tuning the model's parameters to minimize the difference between the model's predictions and the actual labels of the video frames, which can be achieved using a backpropagation algorithm and optimization method, such as stochastic gradient descent (SGD) or Adam. During retraining, the model can learn (e.g., using a neural network) to recognize patterns specific to video data, and which are not present in the image data the model was initially trained on. This learning can include capturing and accurately accounting for the temporal dependencies between consecutive frames and the subtle variations caused by the dynamic adjustments of video camera parameters.

In some embodiments, after retraining, the, adapted retrained YOLOv5 COCO model can perform any of a plurality of video analytics tasks with improved accuracy (as compared with conventional systems and methods), as the retrained model can effectively handle the fluctuations in pixel values between consecutive frames and provide consistent results across different camera models and vendors for any of a plurality of video analytics tasks, in accordance with aspects of the present invention.

In various embodiments, a sequence of video frames captured using a camera can be monitored, captured, and/or received (e.g., by a server 206 with reference to FIG. 2) in block 602. Each frame can be passed through a convolutional neural network (CNN), or other type of DNN, trained on a large-scale image dataset, with the CNN acting as a feature extractor, transforming each frame into a high-dimensional feature vector and generating output of a sequence of feature vectors corresponding to the sequence of frames in the video, in block 604. In block 606, the sequence of feature vectors can be passed through a temporal feature aggregation layer to capture temporal dependencies between consecutive frames, and outputting a second sequence of feature vectors, and a second sequence of feature vectors can be passed through a classifier to capture temporal dependencies between consecutive frames and output a prediction for the selected task in block 608.

In block 610, the entire model (including the feature extractor, the temporal feature aggregation layer, and the classifier) can be trained using, for example, end-to-end using backpropagation and an optimization algorithm (e.g., stochastic gradient descent), and the training can include fine-tuning pre-trained weights of the CNN during the training. In block 612, a generated model prediction for each frame in the video can be output, taking into account both the visual content of the frames (e.g., captured by the CNN) and the temporal dependencies between them (e.g., captured by the temporal feature aggregation layer), in accordance with aspects of the present invention Referring now to FIG. 7, a diagram showing a system 700 for increasing accuracy of video analytics tasks in real-time by reducing fluctuations in accuracy of video analytics applications across video frames by retraining a pretrained Deep Neural Network (DNN) using transfer learning and/or adaptive tuning of a confidence threshold, is illustratively depicted in accordance with embodiments of the present invention.

In various embodiments, one or more video cameras 702 can acquire video data, and video data streams from the camera 702 can be transmitted over a computing network 704 (e.g., WiFi, wireless, 4G, 5G, CAN bus, LAN, WAN, wired, etc.), and can be analyzed and processed (e.g., for performing video analytics tasks) using one or more processor devices 706 and/or a neural network 712 to reduce video fluctuations between consecutive video frames and increase performance of video analytics applications, in accordance with aspects of the present invention. The system 700 can be utilized to improve video analytics tasks (e.g., object and people detection, tracking, identification, etc.) in, for example, a security processing system 708, an autonomous/semi-autonomous vehicle 710, or other scenarios in which accurate and fast detection and identification of objects and people in real-time is desired by a user, in accordance with aspects of the present invention.

In various embodiments, a video analytics accuracy fluctuation quantifying device 714 can quantify fluctuations across frames in a video using Equations F2 and/or F10, as described herein above. A neural network trainer/learning device 716 can be utilized to execute transfer learning training on a pre-trained DNN model to reduce fluctuations in video analytics accuracy, in accordance with aspects of the present invention. In some embodiments, video analytics accuracy can be further improved by dynamically adaptively tuning a confidence threshold using the processor devices 706 and/or the neural network 712, using a video compression adjustment device 718 to reduce video compression, and/or a video motion and lighting adjustment device 720 to mitigate adverse effects for video analytics tasks caused by motion and lighting in a video. A video analytics device 722 can be utilized to detect, track, and/or identify objects, people, and/or animals, and a controller device 724 can be utilized for any of a plurality of automated tasks based on the results of the video analytics device 722 (e.g., automatically unlock office door upon confirmation of identity of a person in a live video stream, automatically adjust any of a plurality of vehicle operations (e.g., accelerate, brake, etc.) to avoid objects and people, etc.), in accordance with aspects of the present invention.

Figure 7:
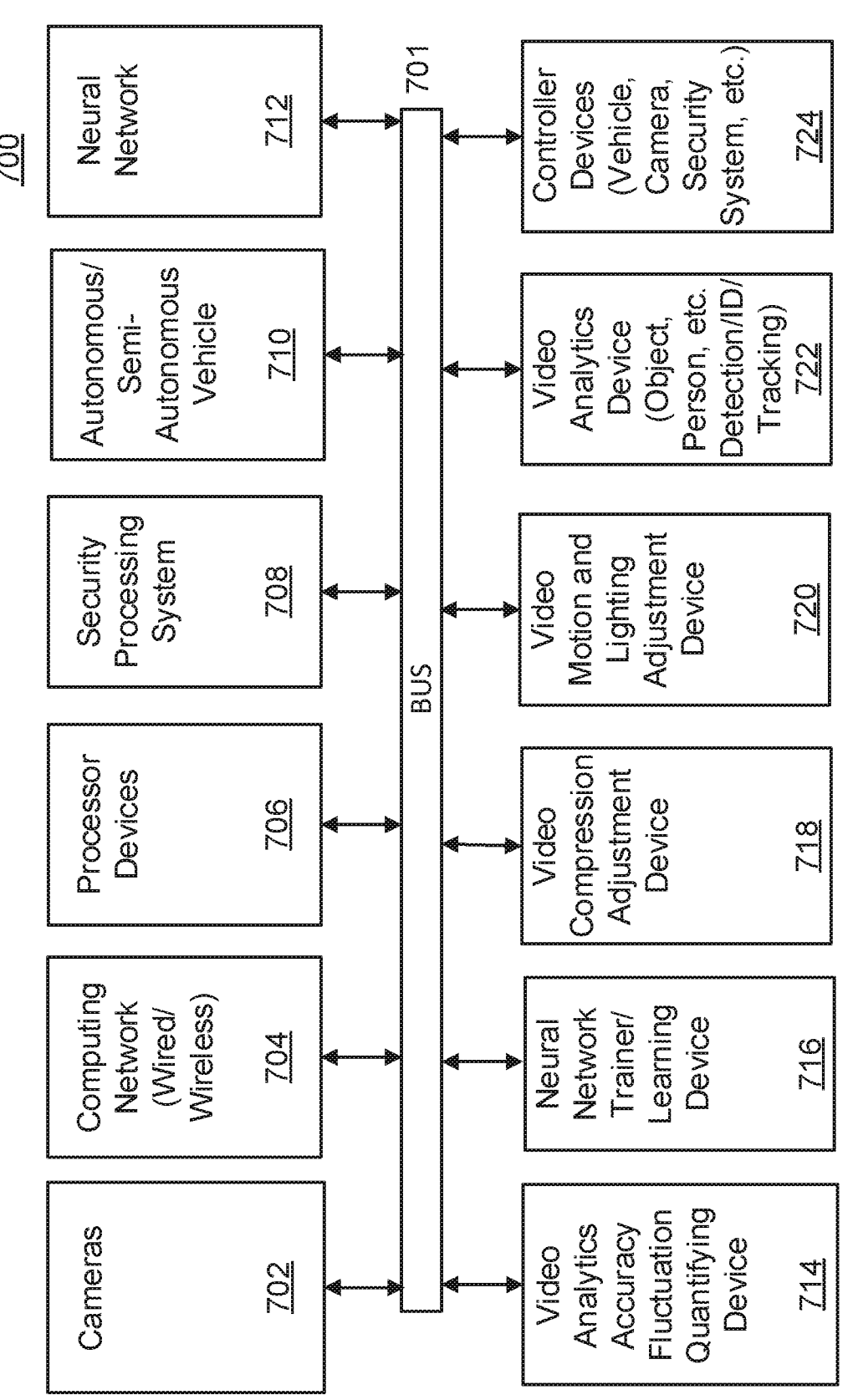
FIG. 7 is a diagram illustratively depicting a system for increasing accuracy of video analytics tasks in real-time by reducing fluctuations in accuracy of video analytics applications across video frames by retraining a pretrained Deep Neural Network (DNN) using transfer learning and/or adaptive tuning of a confidence threshold, in accordance with embodiments of the present invention.

In the embodiment shown in FIG. 7, the elements thereof are interconnected by a bus 701. However, in other embodiments, other types of connections can also be used. Moreover, in an embodiment, at least one of the elements of system 700 is processor-based and/or a logic circuit and can include one or more processor devices 706. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 700 are readily determined by one of ordinary skill in the art, given the teachings of the present principles provided herein, while maintaining the spirit of the present principles.

Figure 8:
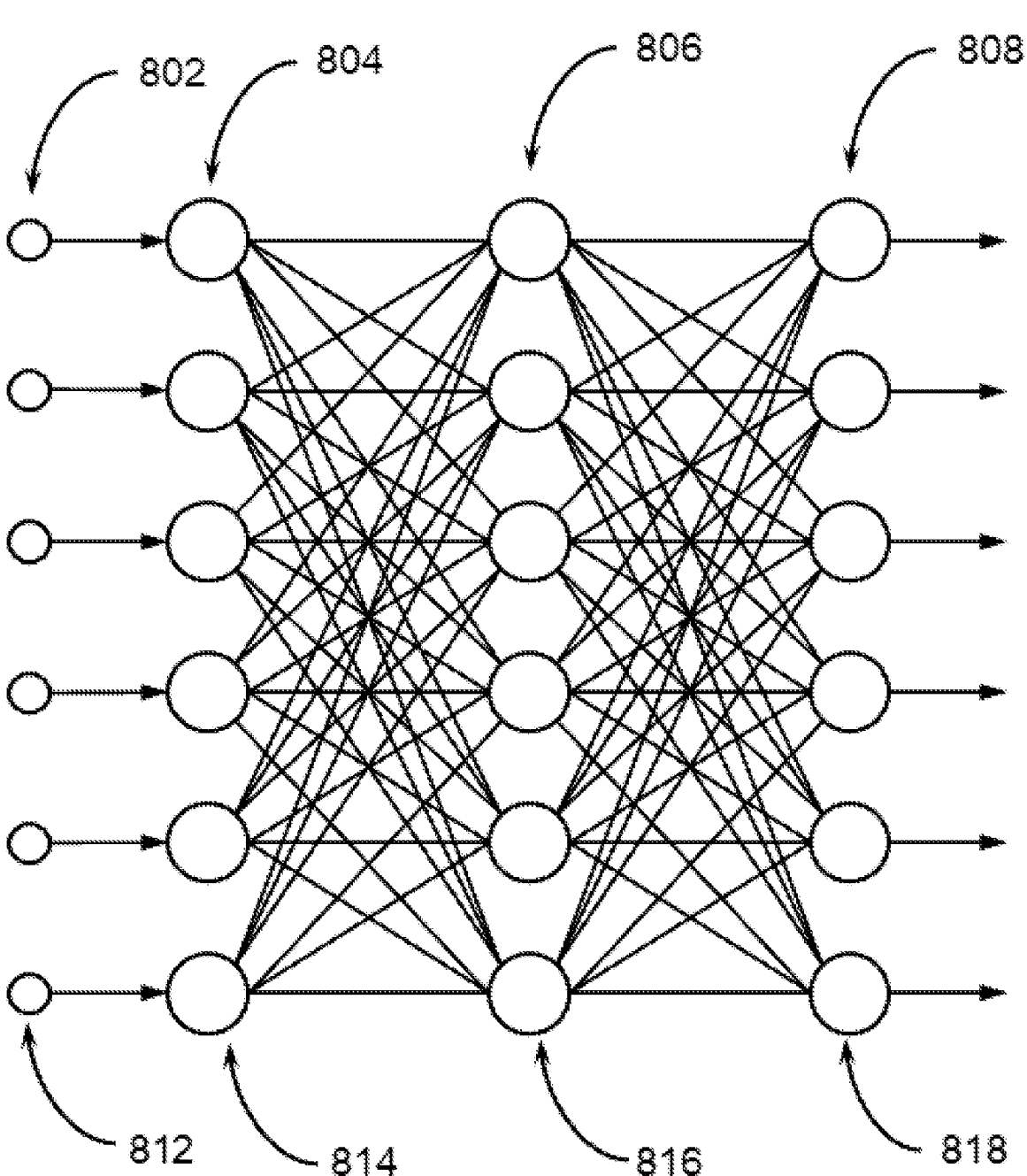
FIG. 8 is a block/flow diagram illustratively depicting a high-level view of a deep neural network, in accordance with embodiments of the present invention.

Referring now to FIG. 8, a high-level view of an exemplary deep neural network 800, is illustratively depicted in accordance with embodiments of the present invention.

A deep neural network, also referred to as a multilayer perceptron, has an input layer 804 of source nodes 814, one or more computation layer(s) 806 having one or more computation nodes 816, and an output layer 808, where there is a single output node 818 for each possible category into which the input example could be classified. An input layer 804 can have a number of source nodes 814 equal to the number of data values 812 in the input data 802. The computation nodes 816 in the computation layer(s) 806 can also be referred to as hidden layers because they are between the source nodes 814 and output node(s) 818 and not directly observed. Each node 816, 818 in a computation layer generates a linear combination of weighted values from the values output from the nodes in a previous layer, and applies a non-linear activation function that is differentiable to the sum. The weights applied to the value from each previous node can be denoted, for example, by $w_1, w_2, \ldots, w_{n-1}\ w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 816 in the one or more computation (hidden) layer(s) 808 perform a nonlinear transformation on the input data 812 that generates a feature space. In the he feature space, the classes or categories may advantageously be more easily separated than in the original data space, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for increasing accuracy of video analytics tasks in real-time, comprising:

acquiring a video using one or more video cameras, and identifying fluctuations in the accuracy of video analytics applications across consecutive frames of the video;

quantifying the identified fluctuations by determining an average relative difference of true-positive detection counts across the consecutive frames;

reducing the fluctuations in accuracy by applying transfer learning to a deep learning model initially trained using images, and retraining the deep learning model using video frames captured for a plurality of different scenarios;

determining a quality of object detections based on an amount of track-ids assigned by a tracker across different video frames;

optimizing the reducing the fluctuations by iteratively repeating the identifying fluctuations, the quantifying the identified fluctuations, the reducing the fluctuations in accuracy, and the determining a quality of object detections until a threshold is reached, wherein the fluctuations in accuracy are quantified by determining the average relative difference of the true-positive object detection counts across the consecutive frames by:

$$\frac{\|tp(i) - tp(i+1)\|}{\text{mean}(gt(i), gt(i+1))},$$

where i represents a video frame, tp(i) represents a true positive object detection count on frame i, and gt(i) represents a ground-truth object count on frame i, on a moving window of 2 frames; and generating model predictions for each frame in the video using the retrained deep learning model for the video analytics tasks.

2. The method as recited in claim 1, further comprising performing object and person detection across the different video frames of the video in real-time with increased detection speed and accuracy by using the deep learning model retrained using the video frames.

3. The method as recited in claim 1, further comprising performing object and person counts for a particular area of interest based on the captured video using the retrained deep learning model, and generating a list of the predicted object and person counts in the area of interest.

4. The method as recited in claim 1, wherein the retraining of the deep learning model using transfer learning includes extracting a plurality of video frames from the video and pre-processing the extracted frames to match input requirements of the deep learning model.

5. The method as recited in claim 1, wherein the fluctuations in accuracy are reduced by adjusting a confidence threshold in the deep learning model based on a difficulty level associated with detection in particular frames of the video.

6. The method as recited in claim 1, wherein the fluctuations in accuracy result from an adversarial effect caused by automatic, dynamic camera parameter changes in a video camera.

7. The method as recited in claim 1, wherein the fluctuations in accuracy are quantified by determining the average relative difference of the true-positive object detection counts across the consecutive frames by:

$$\frac{\|\max(tp(i), \ldots, tp(i+9)) - \min(tp(i), \ldots, tp(i+9))\|}{\text{mean}(gt(i), \ldots, gt(i+9))},$$

where i represents a video frame, tp(i) represents a true positive object detection count on frame i, and gt(i) represents a ground-truth object count on frame i, on a moving window of 10 frames.

8. A system for increasing accuracy of video analytics tasks in real-time, comprising:

a processor operatively coupled to a non-transitory computer-readable storage medium, the processor being configured for:

acquiring a video using one or more video cameras, and identifying fluctuations in the accuracy of video analytics applications across consecutive frames of the video;

quantifying the identified fluctuations by determining an average relative difference of true-positive detection counts across the consecutive frames;

reducing the fluctuations in accuracy by applying transfer learning to a deep learning model initially trained using images, and retraining the deep learning model using video frames captured for a plurality of different scenarios;

determining a quality of object detections based on an amount of track-ids assigned by a tracker across different video frames;

optimizing the reducing the fluctuations by iteratively repeating the identifying fluctuations, the quantifying the identified fluctuations, the reducing the fluctuations in accuracy, and the determining a quality of object detections until a threshold is reached, wherein the fluctuations in accuracy are quantified by determining the average relative difference of the true-positive object detection counts across the consecutive frames by:

$$\frac{\|tp(i) - tp(i+1)\|}{\text{mean}(gt(i), gt(i+1))},$$

where i represents a video frame, tp(i) represents a true positive object detection count on frame i, and gt(i) represents a ground-truth object count on frame i, on a moving window of 2 frames; and generating model predictions for each frame in the video using the retrained deep learning model for the video analytics tasks.

9. The system as recited in claim 8, wherein the processor is further configured for performing object and person detection across the different video frames of the video in real-time with increased detection speed and accuracy by using the deep learning model retrained using the video frames.

10. The system as recited in claim 8, wherein the processor is further configured for performing object and person counts for a particular area of interest based on the captured video using the retrained deep learning model, and generating a list of the predicted object and person counts in the area of interest.

11. The system as recited in claim 8, wherein the retraining of the deep learning model using transfer learning includes extracting a plurality of video frames from the video and pre-processing the extracted frames to match input requirements of the deep learning model.

12. The system as recited in claim 8, wherein the fluctuations in accuracy are reduced by adjusting a confidence threshold in the deep learning model based on a difficulty level associated with detection in particular frames of the video.

13. The system as recited in claim 8, wherein the fluctuations in accuracy result from an adversarial effect caused by automatic, dynamic camera parameter changes in a video camera.

14. The system as recited in claim 8, wherein the fluctuations in accuracy are quantified by determining the average relative difference of the true-positive object detection counts across the consecutive frames by:

$$\frac{\|\max(tp(i), \ldots, tp(i+9)) - \min(tp(i), \ldots, tp(i+9))\|}{\mathrm{mean}(gt(i), \ldots, gt(i+9))},$$

where i represents a video frame, tp(i) represents a true positive object detection count on frame i, and gt(i) represents a ground-truth object count on frame i, on a moving window of 10 frames.

15. A computer program product for increasing accuracy of video analytics tasks in real-time, the computer program product comprising a non-transitory computer readable storage medium having program instructions embodied therewith, the program instructions executable by a computer to cause the computer to perform a method comprising:

acquiring a video using one or more video cameras, and identifying fluctuations in the accuracy of video analytics applications across consecutive frames of the video;

quantifying the identified fluctuations by determining an average relative difference of true-positive detection counts across the consecutive frames;

reducing the fluctuations in accuracy by applying transfer learning to a deep learning model initially trained using images, and retraining the deep learning model using video frames captured for a plurality of different scenarios;

determining a quality of object detections based on an amount of track-ids assigned by a tracker across different video frames;

optimizing the reducing the fluctuations by iteratively repeating the identifying fluctuations, the quantifying the identified fluctuations, the reducing the fluctuations in accuracy, and the determining a quality of object detections until a threshold is reached, wherein the fluctuations in accuracy are quantified by determining the average relative difference of the true-positive object detection counts across the consecutive frames by:

$$\frac{\|tp(i) - tp(i+1)\|}{\mathrm{mean}(gt(i), gt(i+1))},$$

where i represents a video frame, tp(i) represents a true positive object detection count on frame i, and gt(i) represents a ground-truth object count on frame i, on a moving window of 2 frames; and generating model predictions for each frame in the video using the retrained deep learning model for the video analytics tasks.

16. The computer program product as recited in claim 15, further comprising performing object and person counts for a particular area of interest based on the captured video using the retrained deep learning model, and generating a list of the predicted object and person counts in the area of interest.

17. The computer program product as recited in claim 15, wherein the retraining of the deep learning model using transfer learning includes extracting a plurality of video frames from the video and pre-processing the extracted frames to match input requirements of the deep learning model.

* * * * *